(12) United States Patent
Faifer

(10) Patent No.: US 8,109,032 B2
(45) Date of Patent: Feb. 7, 2012

(54) ACCESSORY HOLDER WITH LINEAR ACTUATOR

(76) Inventor: Sagi Faifer, Mishmar Hashiva (IL)

( * ) Notice: Subject to any disclaimer, the term of this patent is extended or adjusted under 35 U.S.C. 154(b) by 199 days.

(21) Appl. No.: 12/325,292

(22) Filed: Dec. 1, 2008

(65) Prior Publication Data

US 2009/0140015 A1   Jun. 4, 2009

Related U.S. Application Data

(60) Provisional application No. 60/991,774, filed on Dec. 3, 2007.

(51) Int. Cl.
F41G 1/34 (2006.01)
F41G 11/00 (2006.01)

(52) U.S. Cl. ............ 42/146; 42/114; 362/110; 362/113; 362/114

(58) Field of Classification Search ............... 42/90, 113, 42/114, 117, 146, 143, 111, 99; 362/110–114
See application file for complete search history.

(56) References Cited

U.S. PATENT DOCUMENTS

| | | | |
|---|---|---|---|
| 1,448,352 A * | 3/1923 | Barany | 362/184 |
| 1,535,459 A * | 4/1925 | Fredrickson | 362/113 |
| 2,140,880 A * | 12/1938 | Osborn | 362/114 |
| 2,236,736 A * | 4/1941 | Scott | 362/110 |
| 3,235,997 A | 2/1966 | Stoner | |
| 3,442,173 A * | 5/1969 | Muller | 89/127 |
| 4,367,606 A | 1/1983 | Bechtel | |
| 4,545,660 A | 10/1985 | Rudolf | |
| 4,675,486 A * | 6/1987 | Niinuma | 200/276.1 |
| 4,856,218 A * | 8/1989 | Reynolds, Jr. | 42/146 |
| 4,965,952 A | 10/1990 | Miller et al. | |
| 4,984,090 A | 1/1991 | Sasaki et al. | |
| 5,097,613 A | 3/1992 | Miller et al. | |
| 5,430,967 A | 7/1995 | Woodman, III et al. | |
| 5,590,951 A * | 1/1997 | Matthews | 362/205 |
| 5,711,103 A | 1/1998 | Keng | |
| 6,046,572 A * | 4/2000 | Matthews et al. | 320/116 |
| 6,185,854 B1 | 2/2001 | Solinsky et al. | |
| 6,230,431 B1 * | 5/2001 | Bear | 42/117 |
| 6,250,008 B1 | 6/2001 | Silver | |
| 6,289,622 B1 | 9/2001 | Desch et al. | |
| 6,622,416 B2 * | 9/2003 | Kim | 42/146 |
| 6,641,277 B2 * | 11/2003 | Smith | 362/111 |
| 6,663,071 B2 | 12/2003 | Peterson | |
| 6,763,627 B1 | 7/2004 | Kaempe | |
| 6,785,997 B2 * | 9/2004 | Oz | 42/94 |
| 6,817,728 B2 * | 11/2004 | Goko | 362/111 |
| 6,843,015 B2 | 1/2005 | Sharp | |
| 7,032,494 B2 | 4/2006 | Wygant | |
| 7,111,424 B1 | 9/2006 | Moody | |
| 7,117,624 B2 * | 10/2006 | Kim | 42/85 |
| 7,117,627 B2 | 10/2006 | Woodmansee, III et al. | |

(Continued)

FOREIGN PATENT DOCUMENTS

GB   2456545   7/2009

(Continued)

*Primary Examiner* — Michael Carone
*Assistant Examiner* — Joshua Freeman
(74) *Attorney, Agent, or Firm* — Deborah Gador

(57) ABSTRACT

An accessory holder including a housing for holding an accessory and a switching mechanism operable independently from at least two locations on the holder for actuating an accessory in the housing. In particular, the accessory holder can be mounted on a T-grip.

20 Claims, 2 Drawing Sheets

U.S. PATENT DOCUMENTS

| | | |
|---|---|---|
| 7,143,672 B1 | 12/2006 | Di Bitonto et al. |
| 7,197,844 B2 | 4/2007 | Benson |
| D542,446 S | 5/2007 | Di Carlo et al. |
| 7,273,292 B2 * | 9/2007 | Kim .............................. 362/112 |
| 7,310,903 B2 * | 12/2007 | Kim .................................. 42/90 |
| 7,325,352 B2 * | 2/2008 | Matthews et al. ................. 42/85 |
| D566,219 S | 4/2008 | Moody et al. |
| D566,220 S | 4/2008 | Moody et al. |
| 7,360,333 B2 * | 4/2008 | Kim .................................. 42/85 |
| D585,517 S | 1/2009 | Faifer |
| 7,490,429 B2 | 2/2009 | Moody et al. |
| 7,523,583 B2 * | 4/2009 | Cheng ............................ 42/146 |
| 7,559,167 B1 | 7/2009 | Moody et al. |
| 7,568,304 B1 | 8/2009 | Moody et al. |
| 7,584,568 B1 | 9/2009 | Brownlee |
| 7,591,098 B2 * | 9/2009 | Matthews et al. ................. 42/85 |
| 7,621,065 B2 * | 11/2009 | Gablowski ..................... 42/135 |
| 7,685,761 B2 * | 3/2010 | Wu ................................ 42/146 |
| 7,731,380 B2 * | 6/2010 | Wu .............................. 362/113 |
| 7,736,013 B2 * | 6/2010 | Griffin ........................... 362/110 |
| 7,823,855 B2 | 11/2010 | Faifer |
| 7,900,390 B2 | 3/2011 | Moody et al. |
| 7,909,301 B2 | 3/2011 | Faifer |
| 2004/0060222 A1 * | 4/2004 | Oz .................................. 42/146 |
| 2005/0188596 A1 | 9/2005 | Wygant |
| 2005/0241206 A1 | 11/2005 | Teetzel |
| 2006/0278797 A1 | 12/2006 | Keng et al. |
| 2008/0040965 A1 * | 2/2008 | Solinsky et al. ................... 42/90 |
| 2008/0052979 A1 | 3/2008 | Lee |
| 2008/0205037 A1 * | 8/2008 | Griffin ........................... 362/110 |
| 2008/0209789 A1 * | 9/2008 | Oz .................................... 42/90 |
| 2009/0038199 A1 | 2/2009 | Oz |
| 2009/0038200 A1 | 2/2009 | Keng |
| 2009/0140015 A1 * | 6/2009 | Faifer ............................ 224/191 |
| 2010/0229452 A1 * | 9/2010 | Suk ................................. 42/146 |

FOREIGN PATENT DOCUMENTS

JP    02118400 A    5/1990

* cited by examiner

ACCESSORY HOLDER WITH LINEAR ACTUATOR

RELATED APPLICATIONS

This application claims the benefit of US provisional patent application No. 60/991,774 filed Dec. 3, 2007.

FIELD OF THE INVENTION

The present invention relates to accessory holders in general and, in particular, to an accessory holder with an actuator for an accessory held in the accessory holder.

BACKGROUND OF THE INVENTION

The present invention relates to an accessory holder forming part of a T-grip for firearms, cameras, and other similar devices requiring accessories. The T-grip can be mounted, as a fore grip, permanently on a pistol or a rifle or, alternatively, it may be mounted on a standard mounting rail, such as a Weaver or Picatinny Rail, or any other rail complementary to the T-grip's mounting rail. The T-grip, as known in the art, may further include an accessory holder for holding accessories, such as a flashlight or a laser pointer. Activation or deactivation of the accessory, when in the holder, presents a difficulty to the user who must remove his hand from the grip in order to reach the switch on the accessory. There are known conventional T-grips with a button or actuator on one side or in the handle, for activating the accessory. However, these actuators are in a fixed location and cannot be adjusted for different users.

Accordingly, there is a long felt need for an accessory holder with a flexible actuating mechanism, and it would be very desirable to have an accessory holder, especially in a T-grip, which includes a versatile switching mechanism for activation from different locations on the holder.

SUMMARY OF THE INVENTION

The present invention relates to an accessory holder including a switching mechanism for actuating an accessory in the holder. The switching mechanism is operable from at least two locations on the holder, for example, from either side of the grip and/or from the rear, so as to turn the accessory on or off.

There is thus provided, according to the present invention, an accessory holder including a housing for holding an accessory and a switching mechanism operable independently from at least two locations on the holder for actuating an accessory in the housing.

According to a preferred embodiment, the switching mechanism includes three actuating buttons, one on each side of the housing and one on the rear.

According to another embodiment, the switching mechanism includes a track defined along the holder, a base reciprocating mounted in the track, an actuator coupled to the base and arranged to be disposed adjacent a switch on an accessory in the housing, and at least two actuating buttons coupled to the base for activating the switch by means of the actuator.

There is further provided, according to the invention, a method for forming an accessory holder, the method including providing a housing for holding an accessory and coupling, to the housing, a switching mechanism which is operable independently from at least two locations on the holder for actuating an accessory in the housing.

According to one embodiment of the invention, the switching mechanism includes a track defined along the holder, a base reciprocating mounted in the track, an actuator coupled to the base and arranged to be disposed adjacent a switch on an accessory in the housing, and at least two actuating buttons coupled to the base for activating the switch by means of the actuator, and the step of actuating an accessory includes causing linear motion of the base so as to cause the actuator to engage the accessory.

BRIEF DESCRIPTION OF THE DRAWINGS

The present invention will be further understood and appreciated from the following detailed description taken in conjunction with the drawings in which.

DETAILED DESCRIPTION OF THE INVENTION

The present invention relates to an accessory holder including a switching mechanism for actuating an accessory in the holder. The switching mechanism is characterized by being operable from at least two locations on the holder, for example, from either side of the grip and/or from the rear. Thus, left- and right-handed users can utilize a single holder and, if the fingers are occupied, the accessory can be actuated from the rear, using the thumb or the web between the thumb and index finger.

Figure 1:
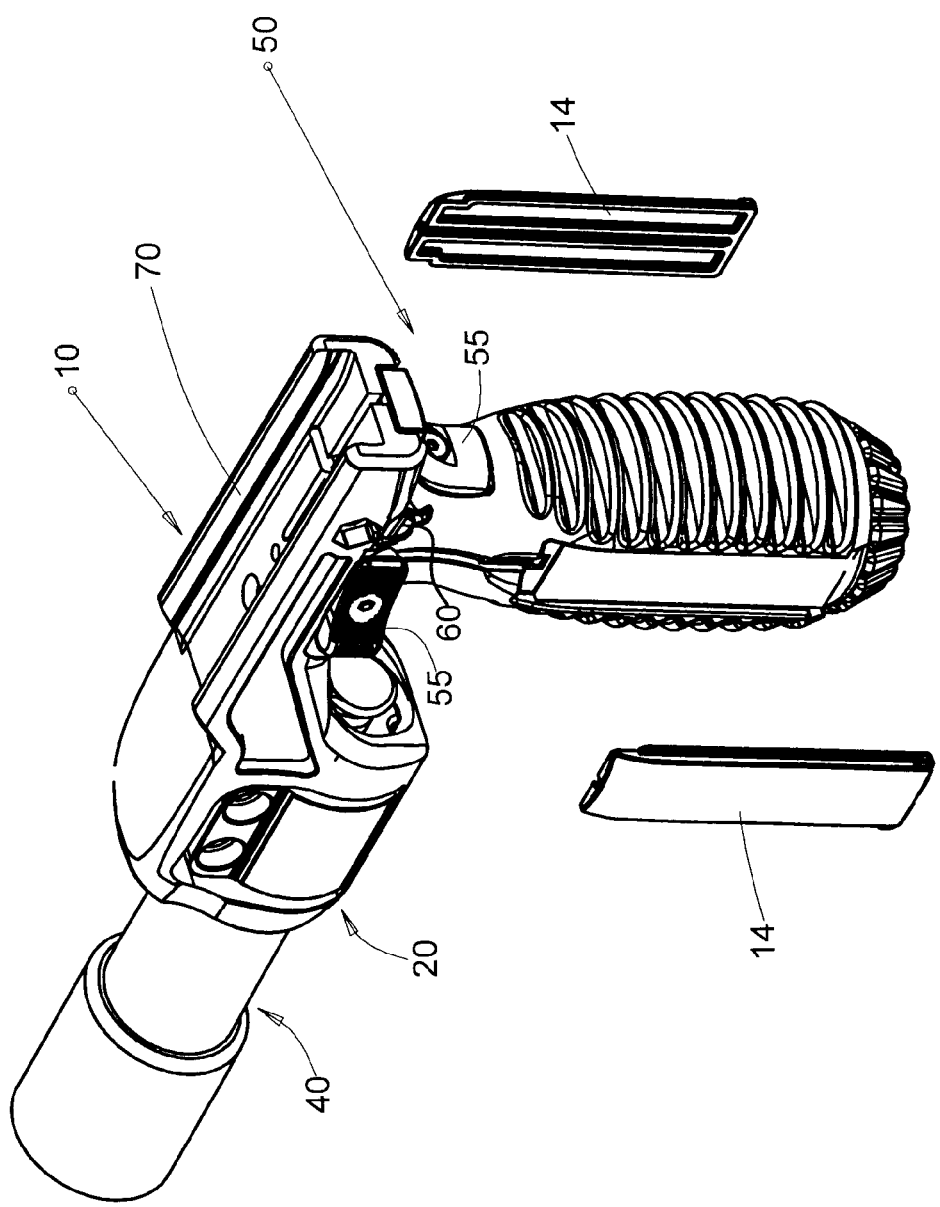
FIG. 1 is a schematic illustration of an accessory holder with an actuator for an accessory constructed and operative in accordance with one embodiment of the present invention, embodied as a T-grip.

FIG. 1 is a perspective view of a T-grip 10 constructed and operative in accordance with one embodiment of the present invention. T-grip 10 includes a handle 16 and a mounting rail 70, as in conventional T-grip handles. T-grip 10 further includes an accessory housing 20 which, in this figure, is holding a flashlight 40. Mounting rail 70 can be any mounting rail complementary to a rail on a device on which the T-grip is to be mounted, for example a Picatinny rail. It is a particular feature of the present invention that T-grip 10 also includes a switching mechanism 50, allowing the user to turn the accessory on and off by means of any one of a plurality of actuators, here illustrated as three different buttons 55 on grip 10. This arrangement overcomes the difficulty of accessing the activating switch on the flashlight or other accessory in the holder.

Figure 2:
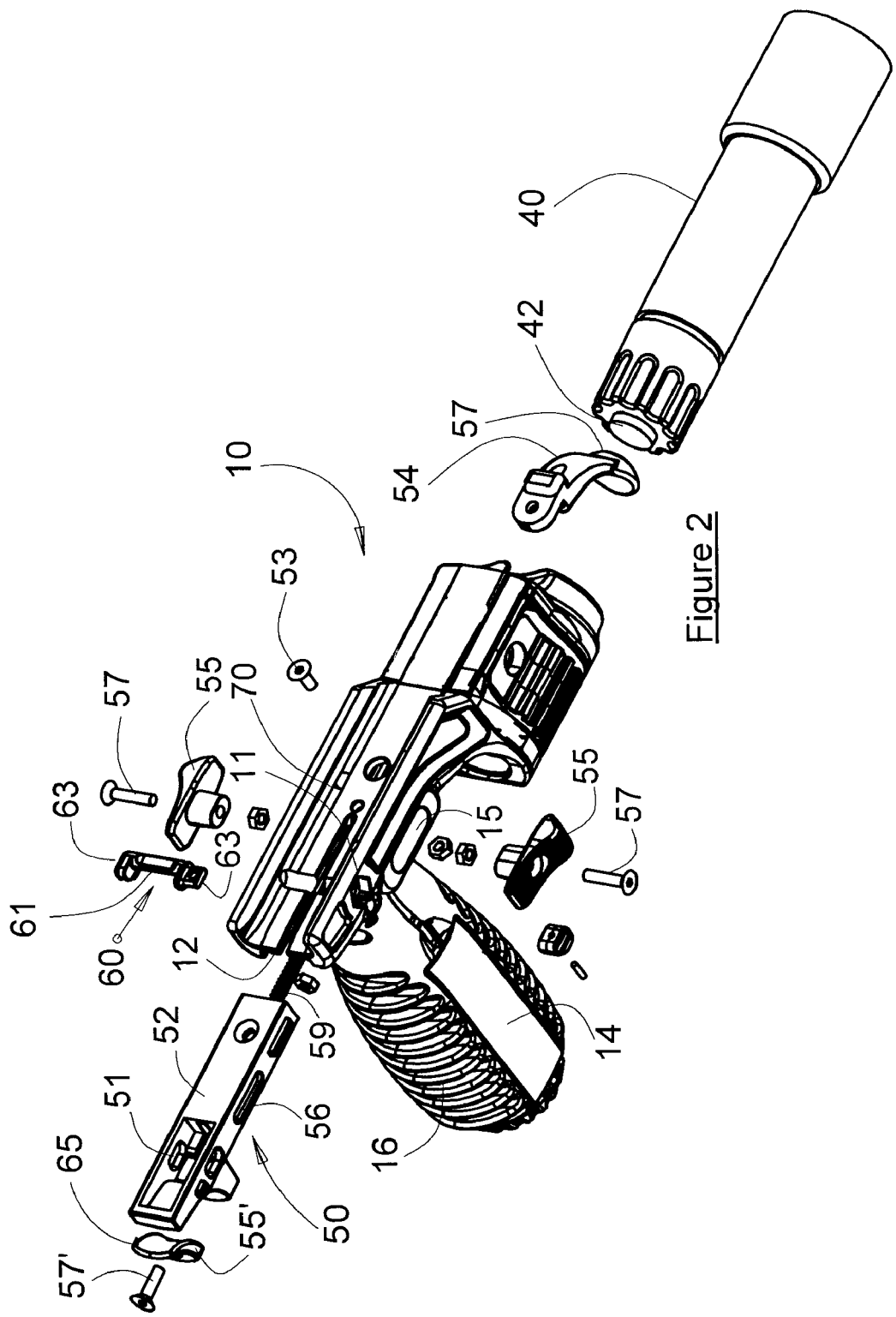
FIG. 2 is an exploded illustration of a switching mechanism mounted in an accessory holder, according to a preferred embodiment of the invention.

A switching mechanism 50, according to one embodiment of the invention, is shown in an exploded illustration in FIG. 2. Switching mechanism 50 includes a transfer mechanism that enables the user to create linear motion for pressing a push button switch 42 on the rear of an accessory 40 in the holder, without having to touch the push button 42 with his finger. Switching mechanism 50 includes a base 52 which is reciprocating inserted in a track 12, which may be defined underneath mounting rail 70. Switching mechanism 50 further includes an actuator 54, which is connected to base 52, preferably by a pin 53. Actuator 54 includes a protrusion 57 for releasably engaging push button 42. Thus, as base 52 is urged towards the accessory, push button 42 is pressed by protrusion 57, thereby switching on the accessory.

In order to permit the user to releasably push base 52 forwards, switching mechanism 50 may include a button 55 for engagement by a finger of the user on each side of the grip, attached to base 52, as through a throughgoing bore 15 on grip 10. Buttons 55 preferably are wave shaped, having one side higher than the other. This permits the button to be coupled to base 52 with either the higher or lower portion of the wave towards the user. In this way, the grip can be customized for the comfort of the user, depending on the length of the user's fingers.

Switching mechanism 50 may further include a rear button 55' on the rear end of the grip, attached to the rear end of base 52. Rear button 55' may include a concave engaging surface 65 complementary to the U-shaped web formed between the thumb and the index finger when spread apart. Thus, rear button 55' may be pressed by the user holding the grip, merely by pressing the inside of his palm against the grip, without moving any of his fingers. Buttons 55 may be attached to base 52 via apertures 56, for example, with fastening pins 57. Similarly, button 55' may be attached to base 52 with a fastening pin 57'. It will be appreciated that switching mechanism 50 preferably includes a spring 59, or any other mechanism, for returning base 52 to its released position after pushbutton 42 is pressed. Thus, by pushing any one of the buttons independently, the user causes reciprocating motion of the base to turn the accessory on and off.

In the embodiment illustrated in FIG. 2, switching mechanism 50 includes a safety latch 60 for securing base 52 in the non-activating position. Safety latch 60 prevents undesired activation of flashlight 40 or other accessory, in case of accidental pressure on buttons 55 or 55', applied by the user. Safety latch 60, in the illustrated embodiment, is inserted in apertures 51 on base 52 as through a throughgoing bore 11 on grip 50, thereby securing base 52 relative to track 12. Safety latch 60 has a cut-away middle portion 61, and edges 63 which are substantially the same size as apertures 51. When edge 63 is disposed inside aperture 51, base 52 is locked relative to the holder.

T-grip 10 may further include an additional switch, as a part of grip handle 16, allowing the user to activate or deactivate the accessory, merely by applying pressure to grip handle 16. In the embodiment illustrated in FIG. 1, grip handle 16 includes grip linings 14, and a contact switch or a push button underneath (not shown). Applying pressure to grip linings 14 activates or deactivates the switch, which may be wired directly to the accessory, inside accessory holder 20. If desired, grip handle 16 can be hollow, as for holding batteries.

T-grip 10 presents a solution for firm holding of a submachine gun or rifle with an electric accessory mounted to it, allowing a convenient activation of the accessory by using either hand of the user. It can also be used as a grip mounted on any device having a complementary mounting rail.

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims which follow.

The invention claimed is:

1. An accessory holder for a handheld firearm, the holder comprising:
    a grip which comprises
      an upper portion, and
      an elongated handle which includes a front side and a rear side;
    a housing spaced from the grip for holding a removable accessory having an actuable switch thereon; and
    a mechanical switching mechanism in the grip, including a linearly movable transfer mechanism and at least two actuators, manipulable independently by a user, mounted in at least two locations on the grip, for causing said linearly movable transfer mechanism to actuate the switch of an accessory in the housing; and
    a mounting rail for removably mounting the grip and the holder on a firearm.

2. The accessory holder according to claim 1, wherein said switching mechanism includes three actuating buttons, one mounted on each side of the holder and one on the rear side of the handle.

3. The accessory holder according to claim 2, wherein said switching rear actuating button includes a concave engaging surface.

4. The accessory holder according to claim 2, wherein at least one of said side buttons defines a wave shape for engagement by a finger of a user.

5. The accessory holder according to claim 1, wherein said switching mechanism includes:
    a linear track defined in said upper portion;
    a base reciprocatingly mounted in said track;
    a mechanical actuator coupled to said base and disposed adjacent a switch on an accessory in said housing; and
    at least two actuating buttons adjustably and removably coupled to said base for moving said mechanical actuator linearly so as to activate said switch by means of said actuator.

6. The accessory holder according to claim 5, wherein said at least two actuating buttons includes three actuating buttons, one coupled to each side of said base and a third coupled to a rear of said handle.

7. The accessory holder according to claim 1, further comprising a T-grip, said accessory holder being coupled to said T-grip.

8. The accessory holder according to claim 1, further comprising a safety latch for preventing unintentional movement of said linearly movable transfer mechanism and inadvertent activation of the accessory.

9. A method for forming an accessory holder for a handheld firearm, the method comprising:
    forming a grip from an upper portion and an elongated handle which comprises a front side and a rear side;
    integrally forming with said grip a housing for holding a removable accessory having an actuable switch thereon; and
    coupling a mechanical switching mechanism to said grip, said switching mechanism including a linearly movable transfer mechanism and at least two actuators, manipulable independently by a user, mounted in at least two locations on the grip, for causing said linearly movable transfer mechanism to actuate the switch of an accessory in the housing; and
    coupling a mounting rail to said upper portion for removably mounting the accessory holder on a firearm.

10. The method according to claim 9, wherein
    said step of coupling includes:
    coupling a switching mechanism including:
      a linear track defined in said upper portion;
      a base reciprocatingly mounted in said track;
      a mechanical actuator coupled to said base and disposed adjacent a switch on an accessory in said housing; and
    at least two actuating buttons adjustably and removably coupled to said base for moving said mechanical actuator linearly so as to activate said switch by means of said actuator; and
    said step of actuating an accessory includes causing reciprocating motion of said base so as to cause said actuator to engage said accessory.

11. The method according to claim 10, further comprising coupling three actuating buttons to said base, one coupled to each side of said base and extending out from said side of the base and a third coupled to a rear of said base and extending out of said rear side of said handle, each of said buttons being adapted and configured to cause, independently, reciprocating motion of said base in said track.

12. The method according to claim 9, further comprising coupling a safety latch to the holder for preventing unintentional movement of said linearly movable transfer mechanism and inadvertent activation of the accessory.

13. An accessory holder, for a gun having a mounting rail, comprising:
- a mount which comprises
  - a flange for securing the grip to a gun-borne mounting rail,
  - a channel inside the mount which comprises a first longitudinal axis,
  - a first exterior surface which comprises a first opening extending from the first exterior surface to the channel;
- an elongated handle, extending from the mount, which comprises
  - a front grip face, and
  - a rear grip face which comprises a second opening extending into the elongated handle;
- a receptacle, connected to the mount and spaced from the elongated handle, which comprises
  - a leading end, and
  - a trailing end disposed between the leading end and the front grip face,
  the receptacle being operable between a first state and a second state such that in the first state an accessory disposed in the receptacle is readily removable, and in the second state an accessory disposed in the receptacle is secure; and
- an oscillating member comprising
  - a proximal segment disposed in the channel,
  - a distal end disposed between the leading end and the front grip face,
  - a first button disposed in the first opening,
  - a second button disposed in the second opening
  the oscillating member being operatively associated with the receptacle such that movement of the first or second button toward the receptacle translates the distal end of the oscillating member toward the receptacle.

14. The accessory holder of claim 13, wherein the accessory holder is operable between first and second configurations such that in the first configuration the distal end of the oscillating member is spaced a first distance from the front grip face and in the second configuration the distal end of the oscillating member is spaced a second distance from the front grip face, the second distance being greater than the first distance.

15. The accessory holder of claim 14, wherein the accessory holder is biased in the first configuration.

16. The accessory holder of claim 14, wherein the second button is proximate the rear grip face such that a user gripping the handle with a hand that comprises an index finger, thumb and web portion disposed between the index finger and the thumb can move the accessory holder into the second configuration by pressing the second button with the web portion of the hand.

17. The accessory holder of claim 14, wherein the first button comprises a first higher portion, and wherein in the first configuration the first higher portion is located at an initial first-button position with respect to the first opening such that the initial first-button position is selectively adjustable and fixed by a user.

18. The accessory holder of claim 17, wherein the oscillating member further comprises a first button attachment segment such that in the initial first button position the first button is positioned in a first button attachment segment such that the first higher portion is spaced an initial distance from the distal end of the oscillating member, and in a subsequent first-button setting the first button is positioned in the first button attachment segment such that the first higher portion is spaced a subsequent distance from the distal end of the oscillating member, the subsequent distance being different than the initial distance.

19. The accessory holder of claim 13, wherein the mount further comprises a third exterior surface, and a third opening extending from the third exterior surface to the channel.

20. The accessory holder of claim 19, wherein the oscillating member further comprises a third button disposed in the third opening such that movement of the first, second, or third button toward the receptacle translates the distal end of the oscillating member.

* * * * *